UNITED STATES PATENT OFFICE.

GEORGE S. WOLFF, OF PHILADELPHIA, PENNSYLVANIA.

IMPROVEMENT IN COMPOSITIONS FOR STAINING OR DYEING LEATHER, &c.

Specification forming part of Letters Patent No. 194,754, dated August 28, 1877; application filed June 27, 1877.

*To all whom it may concern:*

Be it known that I, GEORGE S. WOLFF, of Philadelphia, Pennsylvania, have invented a new and useful Improvement in Coloring Compositions, of which the following is a specification:

The object of my invention is to make a black coloring composition which may be applied as a permanent stain or dye to many different objects.

In carrying out my invention, I take 0.87 parts of blue aniline, 0.84 of yellow aniline, and 0.29 parts of red aniline, and dissolve them in 74 parts of alcohol, preferably methylic alcohol, the composition, after the complete dissolving of the several ingredients, being passed through any appropriate filtering medium.

The result of this combination is a very dense coloring composition possessing such power of penetration that it can be advantageously applied as a stain or dye to many different objects.

It should be understood that the proportions given may be varied to some extent to accord with variations in the strength or density of the aniline colors employed.

The compound may be used as a black-varnish ingredient by dissolving in it shellac.

The composition may be used as a base for admixture with other materials in order to produce compounds for different purposes, such as shoe-blacking or compounds for renovating harness, coloring skins, &c.

I claim as my invention—

A black coloring composition, consisting of blue, red, and yellow aniline, dissolved in alcohol in about the proportions specified.

In testimony whereof I have signed my name to this specification in the presence of two subscribing witnesses.

GEORGE S. WOLFF.

Witnesses:
HERMANN MOESSNER,
HARRY SMITH.